United States Patent
Fojtik et al.

(10) Patent No.: US 10,162,627 B2
(45) Date of Patent: Dec. 25, 2018

(54) MAINTAINING BUILD SECRETS IN A BUILD CONTAINER

(71) Applicant: Red Hat, Inc., Raleigh, NC (US)

(72) Inventors: Michal Fojtik, Brno (CZ); Vyacheslav Semushin, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 58 days.

(21) Appl. No.: 15/056,365

(22) Filed: Feb. 29, 2016

(65) Prior Publication Data

US 2017/0249128 A1    Aug. 31, 2017

(51) Int. Cl.
 *G06F 9/44* (2018.01)
 *G06F 8/71* (2018.01)
 *G06F 9/445* (2018.01)

(52) U.S. Cl.
 CPC ............ *G06F 8/71* (2013.01); *G06F 9/44505* (2013.01)

(58) Field of Classification Search
 CPC ....................................................... G06F 8/30
 See application file for complete search history.

(56) References Cited

U.S. PATENT DOCUMENTS

| | | | |
|---|---|---|---|
| 6,697,846 B1 * | 2/2004 | Soltis | G06F 17/30194 707/999.001 |
| 8,510,762 B1 | 8/2013 | Gregorio et al. | |
| 8,756,706 B2 | 6/2014 | Chidambaram et al. | |
| 8,914,895 B1 | 12/2014 | Katz et al. | |
| 2004/0194082 A1 * | 9/2004 | Purkeypile | G06F 8/63 717/174 |
| 2005/0005261 A1 | 1/2005 | Severin | |
| 2012/0272204 A1 * | 10/2012 | Olewski | G06F 8/71 717/100 |
| 2013/0162394 A1 * | 6/2013 | Etchegoyen | G06F 21/32 340/5.53 |
| 2015/0324590 A1 | 11/2015 | Krten et al. | |
| 2016/0350081 A1 * | 12/2016 | Kumar | G06F 8/30 |

OTHER PUBLICATIONS

"Injecting Secrets into Jenkins Build Jobs" https://cloudbees.zendesk.com/hc/en-us/articles/203802500-Injecting-Secrets-into-Jenkins-Build-Jobs, Jan. 27, 2016, 4 pages.
Roberts, "Using Secrets Safely in Docker Builds" http://techblog.mdsol.com//2015/10/30/Using-Secrets-Safely-in-Docker-Builds.html, Oct. 30, 2015, 4 pages.
Washburn, "Injecting Secrets into Jenkins Builds Using the Credentials Plugin" https://www.cloudbees.com/blog/injecting-secrets-jenkins-builds-using-credentials-plugin, Jul. 22, 2014, 5 pages.

(Continued)

*Primary Examiner* — Hang Pan
(74) *Attorney, Agent, or Firm* — Lowenstein Sandler LLP

(57) ABSTRACT

Implementations provide for a container-based architecture that can maintain build secrets. A method of the disclosure includes storing a file in a destination directory of a build container. The file includes authentication data to retrieve information from a repository. A build of an application image is initiated at a build container. The application image is built using the information retrieved from the repository via the loaded file. In response to receiving an indication that the build of the application imaged is complete, the loaded file is truncated.

20 Claims, 7 Drawing Sheets

(56) References Cited

OTHER PUBLICATIONS

"Subverting Dockertiles: Secrets, SSH Agents and Multi-Container Builds" http://aidanhs.com/blog/post/2015-10-07-dockerfiles-reproducibility-trickery/, Oct. 7, 2015 10 pages.
Glick, "Credentials Binding Plugin" https://wiki.jenkins-ci.org/display/JENKINS/Credentials+Binding+Plugin, Nov. 24, 2015, 3 pages.
Glick, "Build Secret Plugin" https://wiki.jenkins-ci.org/display/JENKINS/Build+Secret+Plugin, May 13, 2015, 1 page.
"Secrets: Write-Up Best Practices, Do's and Don'ts, Roadmap #13490" https://github.com/docker/docker/issues/13490, May 27, 2015, 12 pages.
"Builds", OpenShift Community Documentation (../../index.html) https://docs.openshift.org/latest/dev_guide/builds.html#using-secrets, accessed Feb. 29, 2016, 41 pages.
"(8) Allow to Consume Secrets in Builds", Sprint 10 https://trello.com/c/m5bPxwh4/643-8-allow-to-consume-secrets-in-builds, accessed Feb. 29, 2016, 11 pages.

* cited by examiner

MAINTAINING BUILD SECRETS IN A BUILD CONTAINER

TECHNICAL FIELD

The implementations of the disclosure relate to container-based computing architectures and, more specifically, relate to maintaining build secrets in a build container of a container-based architecture.

BACKGROUND

Containerization is an operating-system-level virtualization environment for running multiple isolated system containers on a single host machine. Container-based architectures implement containerization. One type of container-based architecture is a Platform-as-a-Service (PaaS) system. A variety of PaaS system offerings exists that include facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on their computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete life cycle of building and delivering web applications and services entirely available from the Internet. Typically, these facilities operate as VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding.

DETAILED DESCRIPTION

Figure 1:
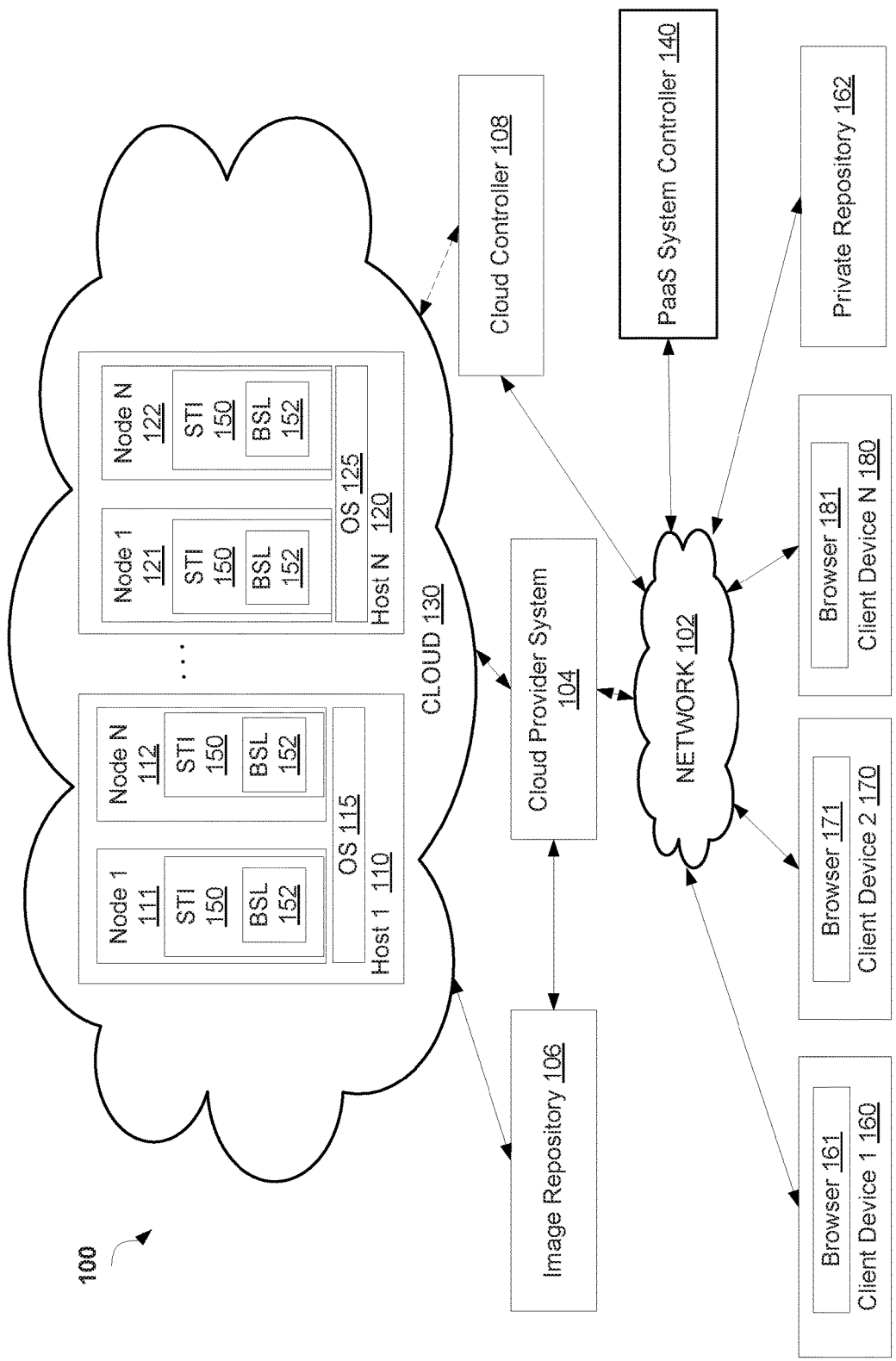
FIG. 1 is a block diagram of a network architecture in which implementations of the disclosure may operate.

Implementations of the disclosure provide for utilization of build secrets by a source-to-image (STI) framework for a Platform-as-a-Service (PaaS) system. The PaaS system may be a container-based architecture (also referred to as a container-based system) having multiple nodes. The STI framework can be implemented (i.e., as an STI component) on all nodes of the PaaS system or, alternatively, on a subset of the nodes of the PaaS system. An application of the PaaS system may be built and executed. The application includes a build container that is used to create an application image. An application image (or an image) refers to data (e.g., binaries) representing executables and files of an application used to deploy functionality for a runtime instance of the application. The application image is built using the STI framework. In one implementation, the application and the application image are built/created using build secrets. The build secrets may be used to build an application image. The build secrets may include confidential data. The confidential data (aka build secret) may be included in a file called a configuration file. The configuration file may include data such as authentication credentials to connect to a private repository to obtain information to build the application image, a location of the private repository, and/or other secret or confidential data.

In one implementation, as part of building an application image for an application using the build container, the configuration file may be used to connect to a private repository. A user (e.g., a developer) may provide the configuration file. The build container may place the configuration file in a destination directory within the build container. Once the configuration file is placed in the destination directory, the build container may access the private repository to obtain information to build the application image.

When the application image build is complete, the configuration file, which includes build secrets, may be truncated by the build container in order to protect the build secrets. Truncating the configuration file includes converting a length of the configuration file to a zero (0) bit length. As the configuration file is truncated, the build secret is not exposed to other users and, thus, remains a build secret. The application image may be committed to a repository without including the build secret.

Previous solutions for utilizing build secrets in a build process for an application image may not protect the build secrets. Once the application image is built in previous solutions, the build secrets may be exposed. Implementations of the disclosure address the shortcomings of the previous solutions by truncating the configuration file containing the build secrets once the application image is built. Truncating the configuration file converts a length of the configuration file to a zero (0) bit length. As a result, the configuration file may be utilized to build the application image and then truncated so that the build secrets are protected and not exposed upon deployment of the application image.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host machine 1 110 through host machine N 120, as part of the cloud 130. In some implementations, the host machines 110, 120 are often located in a data center. For example, nodes 111 and 112 are hosted on host machine 110 in cloud 130 provided by cloud provider system 104. When nodes 111, 112, 121, 122 are implemented as VMs, they may be executed by OSes 115, 125 on each host machine 110, 120. Users can interact with applications executing on the cloud-based nodes 111, 112, 121, 122 using client computer systems, such as client devices 160, 170 and 180, via corresponding web browser applications 161, 171 and 181, respectively.

In some implementations, the host machines 110, 120 are often located in a data center. In other implementations, the applications may be hosted directly on host machines 1 through N 110-120 without the use of VMs (e.g., a "bare metal" implementation), and in such an implementation, the hosts themselves are referred to as "nodes".

Client devices 160, 170, and 180 are connected to host machines 110, 120 in cloud 130 and the cloud provider system 104 via a network 102, which may be a private network (e.g., a local area network (LAN), a wide area network (WAN), intranet, or other similar private networks) or a public network (e.g., the Internet). Each client device 160, 170, 180 may be a mobile device, a PDA, a laptop, a desktop computer, a tablet computing device, a server device, or any other computing device. Each host machine 110, 120 may be a server computer system, a desktop computer or any other computing device. The cloud provider system 104 may include machines such as server computers, desktop computers, etc.

In one implementation, the cloud provider system 104 is coupled to a cloud controller 108 via the network 102. The cloud controller 108 may reside on machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider system 104 and stored in an image repository 106, in an image repository (not shown) located on each host machine 110, 120, or in an image repository (not shown) located on each VM 111, 112, 121, 122.

Upon receiving a command identifying specific data (e.g., application data and files used to initialize an application on the cloud), the cloud provider system 104 retrieves the corresponding data from the image repository 106, creates an instance of it, and loads it to the host machine 110, 120 to run on nodes 111, 112, 121, 122. In addition, a command may identify specific data to be executed on of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on mass storage devices, such as magnetic or optical storage based discs, solid-state-drives (SSDs) or hard drives.

In one implementation, nodes 111, 112, 121, 122 include a source-to-image (STI) component 150. The STI component 150 can be implemented on each of the nodes 111, 112, 121, 122 of the PaaS system or, alternatively, on a subset of the nodes 111, 112, 121, 122. In one implementation, the STI component 150 provides a build secret logic (BSL) 152 framework to input a configuration file to a location in a build container (not shown) for an application image of an application. The configuration file is utilized to retrieve information from a private repository 162. The private repository 162 may store information that is to be kept private. The private repository 162 may be accessed by a private Uniform Resource Locator (URL) that may be a secret and/or using authentication credentials that are stored in the configuration file. When the build container no longer utilizes the configuration file, BSL 152 truncates the configuration file. Further details of STI component 150 and BSL 152 and related workflows are described below with respect to FIG. 2 through 6.

While various implementations are described in terms of the environment described above, the facility may be implemented in a variety of other environments including a single, monolithic computer system, as well as various other combinations of computer systems or similar devices connected in various ways. For example, the data from the image repository 106 may run directly on a physical host machine 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
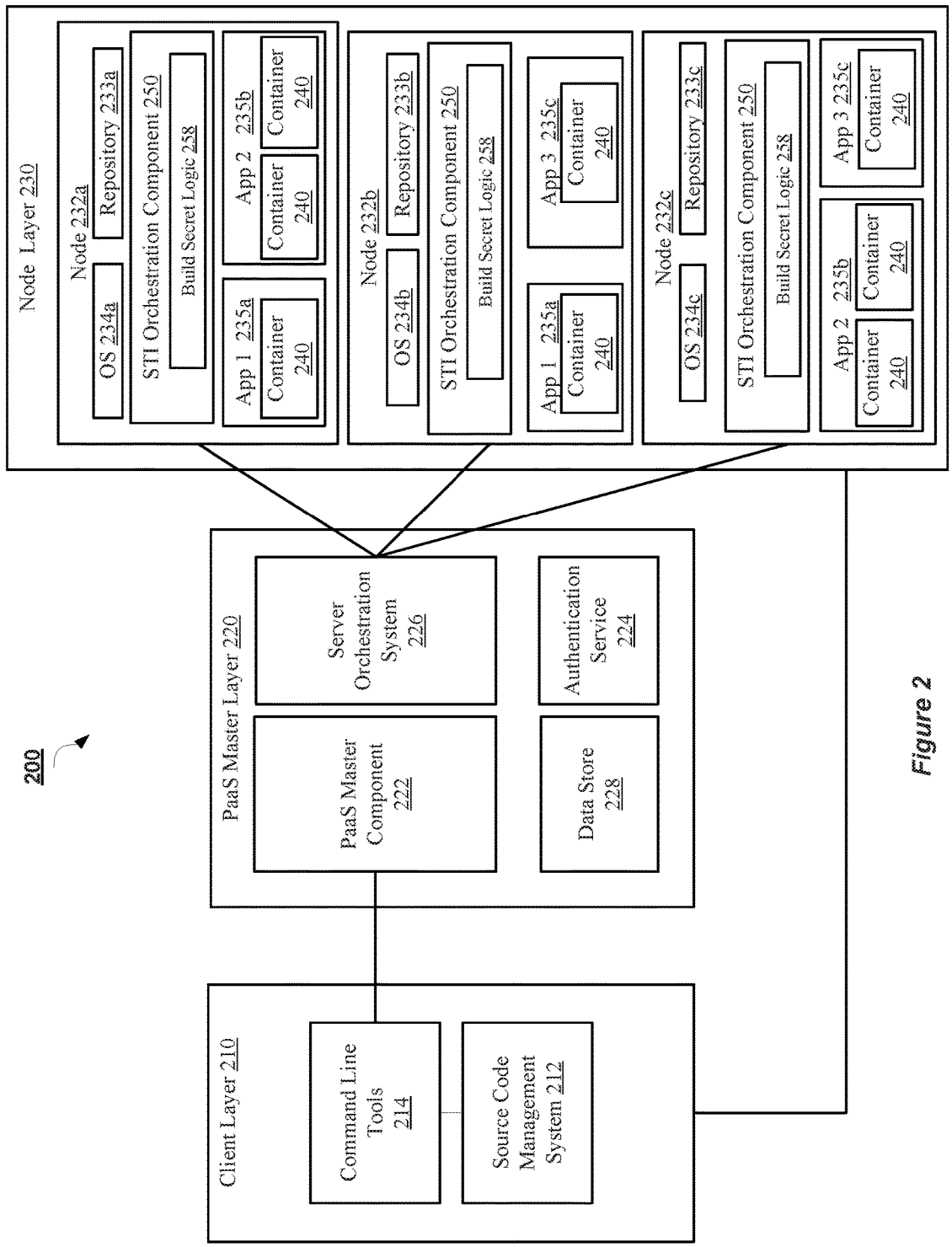
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS system architecture 200 allows users to build application images using build secrets in a cloud computing environment, such as a cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not depicted). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a developer, and provides an interface to a user of the client machine to the PaaS master layer 220 of the PaaS system architecture 200. In one implementation, the client machine can be a client device 160, 170, 180 described with respect to FIG. 1. The PaaS master layer 220 may facilitate the creation and deployment on the cloud (via node layer 230) of applications being developed by an end user at client layer 210.

In one implementation, the client layer 210 includes a source code management system 212, sometimes referred to as "SCM" or revision control system. One example of such an SCM or revision control system is Git, available as open source software. Git and other such distributed SCM systems typically include a working directory for making changes, and a local repository for storing the changes for each application associated with the end user of the PaaS system architecture 200. The packaged application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-b are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented machines, such as server computers, desktop computers, etc. In some implementations, the PaaS master layer 220 may be implemented on machines separate from machines implementing each of the client layer 210 and the node layer 230, or may be implemented together with the client layer 210 and/or the node layer 230 on machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to build an application image, a request to input and protect a configuration file including build secrets, a request to designate a system to host a remote SCM repository (e.g., an indication that a system has been designated by a user to host a remote SCM repository), etc.

In one implementation, a user, using the command line tools 214 at client layer 210, can request the creation of a new application 235a-b, deployment of source code of the application 235a-b, upload a configuration file including build secrets, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-b residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-b to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-b that may be owned or managed by different users and/or organizations. As such, a first customer's deployed applications 235a-b may co-exist with any other customer's deployed applications on the same node 232 that is hosting the first customer's deployed applications 235a-b. In some implementations, portions of an application execute on multiple different nodes 232a-c. For example, as shown in FIG. 2, components of application 1 (235a) run in both node 232a and node 232b. Similarly, components of application 2 (235b) may run in node 232b and node 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) to track and collect information about the node 232a-c and to perform management actions on the node 232a-c. The server orchestration system agent may operate in tandem with the server orchestration system 226 to send requests, queries, and commands between the node 232a-c and the PaaS master layer 220.

In one implementation, each node 232a-c may include an STI orchestration component 250. The STI orchestration component 250 includes build secret logic 258. The STI orchestration component 250 may be the same as STI component 150 described with respect to FIG. 1. The build secret logic 258 may be the same as the build secret logic (BSL 152) described with respect to FIG. 1. In one implementation, the STI orchestration component 250 provides a framework to produce ready-to-run application images for applications 235a-c of the PaaS system. Each application image may map to a functional component of the application 235a-c. As such, an application may have more than one application image associated with the application. The application images include, for example, executable data (e.g., binary file) providing functionality (e.g., configuration templates, scripts, dependencies, etc.) used to run the application 235a-c and/or add a feature to the application 235a-c. For example, the images may support languages such as, but not limited to, Java™, PHP, Ruby, Python, Perl, and so on. In addition, application images may be generated that support databases, such as MySQL™ PostgreSQL™, Mongo™, and others. Application images may also be generated that support build and continuous integration environments, such as a Jenkins-based image. Lastly, application images may be generated to support management capabilities and/or tools, such as PHPmyadmin, RockMongo™, 10gen-mms-agent, cron scheduler, HAProxy, Maven, and Gradle for example.

The STI component 150 can be implemented on each of the nodes 111, 112, 121, 122 of the PaaS system or, alternatively, on a subset of the nodes 111, 112, 121, 122. In some implementations, a separate node 232a-c may be provided that is dedicated to implementing STI orchestration for all nodes 232a-c and applications 235a-c of the PaaS system architecture 200.

In one implementation, an application 235a-c may utilize resource-constrained containers 240 on nodes 232a-c using instances of application image. A container 240 is a resource-constrained process space on the node 232a-c to execute functionality of an application 235a-c. In some implementations, a container 240 is established by the node 232a-c with resource boundaries, including a limit and/or designation of the amount of memory, amount of storage, and security types and/or labels to be applied to any functions executed by the container 240. In one implementation, containers 240 may be established using the Linux Containers (LXC) virtualization method. In further implementations, containers 240 may also be established using cgroups, SELinux™, and kernel namespaces, to name a few examples. In some implementations, STI orchestration component 250 is implemented as a separate container 240 on nodes 232a-c.

In one implementation, the STI orchestration component 250 may receive a configuration file (not depicted). The configuration file may be used to obtain information, such as source code for building application images for applications 235a-c. In some implementations, the configuration file may be used to obtain additional information (not including source code) used to build applications 235a-c. Build secret logic 258 may provide the configuration file to a container 240 that is launched as a build container.

The STI orchestration component 250 may then cause the build container 240 to create a usable runtime application image for the application in the PaaS system architecture 200. The build container 240 is launched using a base image providing core functionality for the application. The STI orchestration component 250 then injects or provides a user-provided source code and/or source code obtained using the configuration file for an application into the base image at the build container 240. The build container 240 then assembles the base image and the source code into a ready-to-use application image for runtime of the application on the PaaS system. When container 240 finishes using the configuration file and an application image for applications 235a-c is built, build secret logic 258 may truncate the file to protect build secrets included within the configuration file.

Once STI orchestration component 250 builds an application image, the application image may be committed to a repository, such as repository 233a-c, or to a remote repository (not shown) outside of nodes 232a-c. The committed application image may then be used to subsequently launch the application 235a-c.

As discussed above, the application images include underlying support that implements the functionality of applications 235a-c. Application image instances for an application 235a-c may be launched in containers 240 dispersed over more than one node 232a-b. In other implementations, application images instances for an application 235a-c may run in containers 240 on the same node 232a-c. Furthermore, an application 235a-c may use more than one application image 240 as part of providing functionality for the application 235a-c. One example of this is a JavaEE™ application that uses a JBoss™ application server-based application image with a supporting MySQL™ database provided by a MySQL™-based application image.

Further details of the configuration file and using and protecting the build secrets contained within the configuration file are described below with respect to FIG. 3.

Figure 3:
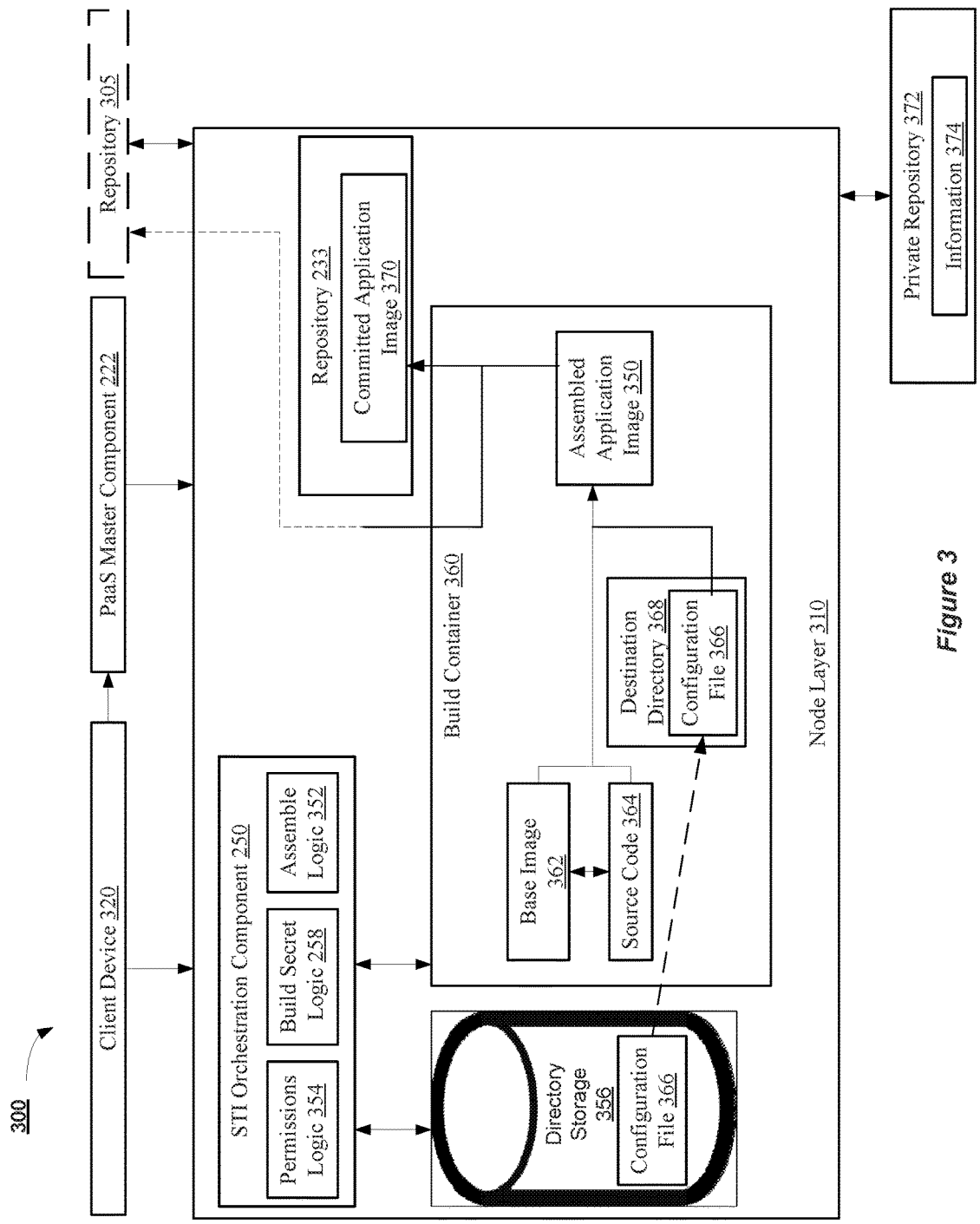
FIG. 3 is a block diagram of a communication architecture of a multi-tenant PaaS providing a source-to-image (STI) framework to utilize build secrets to construct application images of the multi-tenant PaaS system according to an implementation of the disclosure.

FIG. 3 is a block diagram of a communication architecture of a multi-tenant PaaS providing a source-to-image (STI) framework to utilize build secrets to construct application images of the multi-tenant PaaS system according to an implementation of the disclosure. Architecture 300 includes the PaaS master component 222 in communication with a client device 320 and node layer 310. Node layer 310 includes STI orchestration component 250, build secret logic 258, repository 233, and build container 360 distributed across nodes of node layer 310. PaaS master component 222, STI orchestration component 250, build secret logic 258, and repository 233 may be the same as their counterparts described with respect to FIG. 2. Additionally, private repository 372 in FIG. 3 may be the same as private repository 162 in FIG. 1.

Referring again to FIG. 3, in one implementation, PaaS master component 222 may receive a request to initiate a build of an application image for an application (either via an API or another trigger event communicated from client device 320). The PaaS master component 222 may then invoke STI orchestration component 250 to launch build container 360. STI orchestration component 250 includes permissions logic 354, build secret logic 258, and assemble logic 352.

The build container 360 may be a resource-constrained process space on the node layer 310 that builds assembled application image 350 (or application image). The assembled application image 350 is associated with executables and files of an application (not shown) used to deploy functionality for a runtime instance of the application. To build an application image, build container 360 executes assemble logic to combine a base image 362, configuration file 366, and source code 364 to create an application image. In one implementation, base image 362 include an assemble script to cause the base image 362, configuration file 366, and source code 364 to be combined into the assembled application image 350. In other implementations, assemble logic 352 of STI orchestration component 250 provides the assemble logic to the build container 360 when the STI orchestration component 250 invokes the build container 360. In some implementations, build container 360 is established with resource boundaries, including a limit and/or designation of the amount of memory, amount of storage, and security types and/or labels to be applied to any functions executed by the build container 360.

As discussed above, build container 360 may run assemble logic 352 using a base image 362 registered for the application image. In one implementation, the end user identifies the base image 362 when the end user registers the application with the multi-tenant PaaS system. This may allow end users to identify images external to the multi-tenant PaaS for use in the multi-tenant PaaS. The base image 362 may be maintained in a repository of the multi-tenant PaaS, such as repository 233 of node layer 310, or in a remote repository 305 maintained outside of node layer 310. The base image 362 may be associated with core functionality of the application, such as an application framework. Application frameworks include, but are not limited to, PHP™, Ruby™, J2EE™, and so on.

Build container 360 may also runs permissions logic 354. Permissions logic 354 may set permissions of files. Prior to build container 360 assembling source code 364 (e.g., binaries, zipped source, source code, etc.), information 374 (such as configuration information) may be input into source code 364. Information 374 may include source code, dependencies of the project or application image being built or other information used to configure the build of an application image. Information 374 may also include metadata information about the dependencies. The metadata information may include URLs, file checksums, file versions, etc. Information 374 may be stored on a private repository 372. In order for build container 360 to obtain information 374, a configuration file 366 may be utilized. Details regarding how configuration file 366 is obtained and input into build container 360 are described further below. Configuration file 366 may include build secrets. The build secrets may include authentication data such as authentication credentials to securely connect to private repository 372. Configuration file 366 may include a Secure Socket Layer (SSL) certificate or key or other authentication information/mechanism and/or key to connect to private repository 372. Configuration file 366 may further include a URL of private repository 372. Contents of configuration file 366 may include build secrets that a user (e.g., a developer) wishes to keep secret and not divulge to other users upon completion of the building of the application image. The contents of configuration file 366 may be referred to as build secrets.

In one implementation, build container 360 runs build secret logic 258. Build secret logic 258 accesses a destination directory 368 in build container 360 to store the configuration file 366. Destination directory 368 may be located at a particular location within build container 360 or at an arbitrary location. Once destination directory 368 has been identified, configuration file 366 can be stored therein. In an implementation, the build secret logic 258 provides a name for the configuration file 366 that identifies the configuration file 366. For example, the name of the configuration file 366 may be "a build secret configuration file." Therefore, a file having a particular name (e.g., "a build secret configuration file") may be provided to destination directory 368.

The configuration file 366 may be uploaded to the build container 360 in response to a user providing the configuration file. A user (e.g., a developer) operating client device 320 may provide the configuration file 366 to the STI orchestration component 250. The user may be an agent of the private repository 372 and/or a user trusted by the private repository 372 to hold the configuration file 366 that includes build secrets. STI orchestration component 250 provides the configuration file 366 to a directory storage 356. The directory storage 356 may be a temporary storage that holds configuration files. Once configuration file 366 is placed within the directory storage 356, the directory storage 356 notifies the permissions logic 354 in the STI orchestration component 250. The permissions logic 354 may set a permission of the configuration file 366. For example, the permissions logic 354 may set a permission of the configuration file 366 as write-only. In an implementation, the permission may be a universal write-only permission that allows users to write to the configuration file 366. In an implementation, users may not have permission to read the configuration file 366 or remove or delete the contents of the configuration file 366.

After permissions of the configuration file 366 are set, the build secret logic 258 injects or inserts the configuration file 366 into the build container 360. Specifically, the build secret logic 258 injects the configuration file 366 into a location of the destination directory 368. In an implementation, the build secret logic 258 copies or moves the configuration file 366 from the directory storage 356 to the destination directory 368, as shown by the dashed line. In an implementation, after the configuration file 366 is successfully copied or moved to the destination directory 368, if the original configuration file remains in the directory storage 356, the file is deleted by the build secret logic 258 or by the directory storage 356.

As described above, the build container 360 extracts build secrets from the configuration file 366 to connect to and/or obtain information 374 from the private repository 372. For example, the build container 360 may extract a URL of the private repository 372 and authentication credentials such as a key to connect with the private repository 372. Once authentication is complete, the build container 360 retrieves information 374.

Build container 360 may then apply information 374 to source code 364. In one implementation, information 374 may be configuration information that includes a portion of source code 364 to configure an application image. In an implementation, information 374 may include an additional dependency to perform the build of assembled application image 350. The additional dependency may be provided as source code. If an existing dependency already exists within source code 364, the existing dependency may be overwritten by the additional dependency within information 374 retrieved from private repository 372. Build container 360 continues to build the assembled application image 350 using source code 364.

The assemble logic 352 run by build container 360 may apply the source code 364 to the base image 362 to build or assemble an application image. The source code 364 may be provided to build container 360 through various delivery methods. In one implementation, the source code 364 may be streamed, for example, as a tar file to the build container 360. Streaming refers to a process of using hypertext transfer protocol (HTTP) for transmission of files. As described above, portions of source code 364 may be provided by information 374 in private repository 372, or streamed from client device 320, or from another remote location indicated by the user. In another implementation, the source code 364 may be bind-mounted to the build container 360. In a further implementation, source code 364 may be accessed or downloaded using a remote URL providing a location to a private repository or another location provided to build container 360. In some implementations, when the source code 364 is obtained via a URL, the source code 364 may be downloaded prior to the assemble logic 352 building/assembling the application image and then streamed as part of a tar file provided to the build container 360 or used as part of a bind mount.

In an implementation, the private repository 372 may be located remotely from the node layer 310. In another implementation, the private repository 372 may be local to the node layer 310.

When the application image build is complete, build container 360 informs build secret logic 258. In an implementation, a last file to be created is identified by a particular name (e.g., "last build file"). When build container 360 creates the last file, build container 360 determines that the build is complete and informs build secret logic 258. Build secret logic 258 determines that the contents of configuration file 366 are no longer utilized (as the build is complete) and truncates configuration file 366. The truncation of configuration file 366 includes converting a length of the configuration file to a zero (0) bit length. In one implementation, the truncation of configuration file 366 may also include overwriting the content in the configuration file 366 a number of times by random data such that the original content of configuration file 366 (which includes build secrets) is erased.

In an implementation, the configuration file 366 is truncated via a wrapper script in response to the creation of a last file of the application image. The wrapper script may execute files to create the application image. The wrapper script may run in build container 360 or external to build container 360. The wrapper script may identify the last file (i.e., identified by a particular name or other identifier). After the last file is identified, the wrapper script may truncate the configuration file 366.

In response to completing the build of the assembled application image 350, the assemble logic 352 run by build container 360 causes the assembled application image 350 to be committed, as committed application image 370, to a repository 233, 305 (also referred to as a committed application image repository). In one implementation, the committed application image 370 does not include the configuration file 366 (including build secrets such as authentication data, etc.) as the truncation of the configuration file 366 caused the build secrets (confidential data) to be removed. The assembled application image 350 may also not include the configuration file 366. The build container 360 may then stop running. The committed application image 370 may then be used to subsequently launch an application that is associated with the committed application image 370. As the configuration file 366 is truncated, when the committed application image 370 is deployed by a user, the user is not able to access the build secrets that were previously contained within configuration file 366. Runtime containers (not depicted) may then be launched from the committed application image 370.

In some implementations, assemble logic 352, permissions logic 354, and build secret logic 258 may be provided as part of the application image (e.g., as part of base image 362). In another implementation, the assemble logic 352, permissions logic 354, and build secret logic 258 may be external to the application image. The latter scenario allows end users that wish to utilize the base image 362 to be able to modify the assemble logic 352, permissions logic 354, and build secret logic 258 to perform differently. In addition, the latter scenario allows end users to share the same scripts for the assemble logic 352, permissions logic 354, and/or build secret logic 258 across multiple different images.

In an implementation described above, the configuration file 366 may be placed in destination directory 368. In another implementation, data (e.g., authentication data, etc.) that is to be included in configuration file 366 may be copied into a different directory other than the destination directory 368. The data and/or the configuration file including the data may be copied into source code 364 or elsewhere in build container 360. When the assembled application image 350 is built, the data and/or the configuration file 366 may be truncated. The data and/or the configuration file may not be present in containers that launch from the assembled application image 350, however, the assembled application image 350 may include the data and/or the configuration file 366.

In another implementation, the configuration file may be mounted or transferred into the build container 360. If the configuration file is mounted in a manner that replaces existing content within the build container 360, it may not be possible to truncate the configuration file. Therefore, the configuration file may instead be placed in the destination directory 368.

Figure 4:
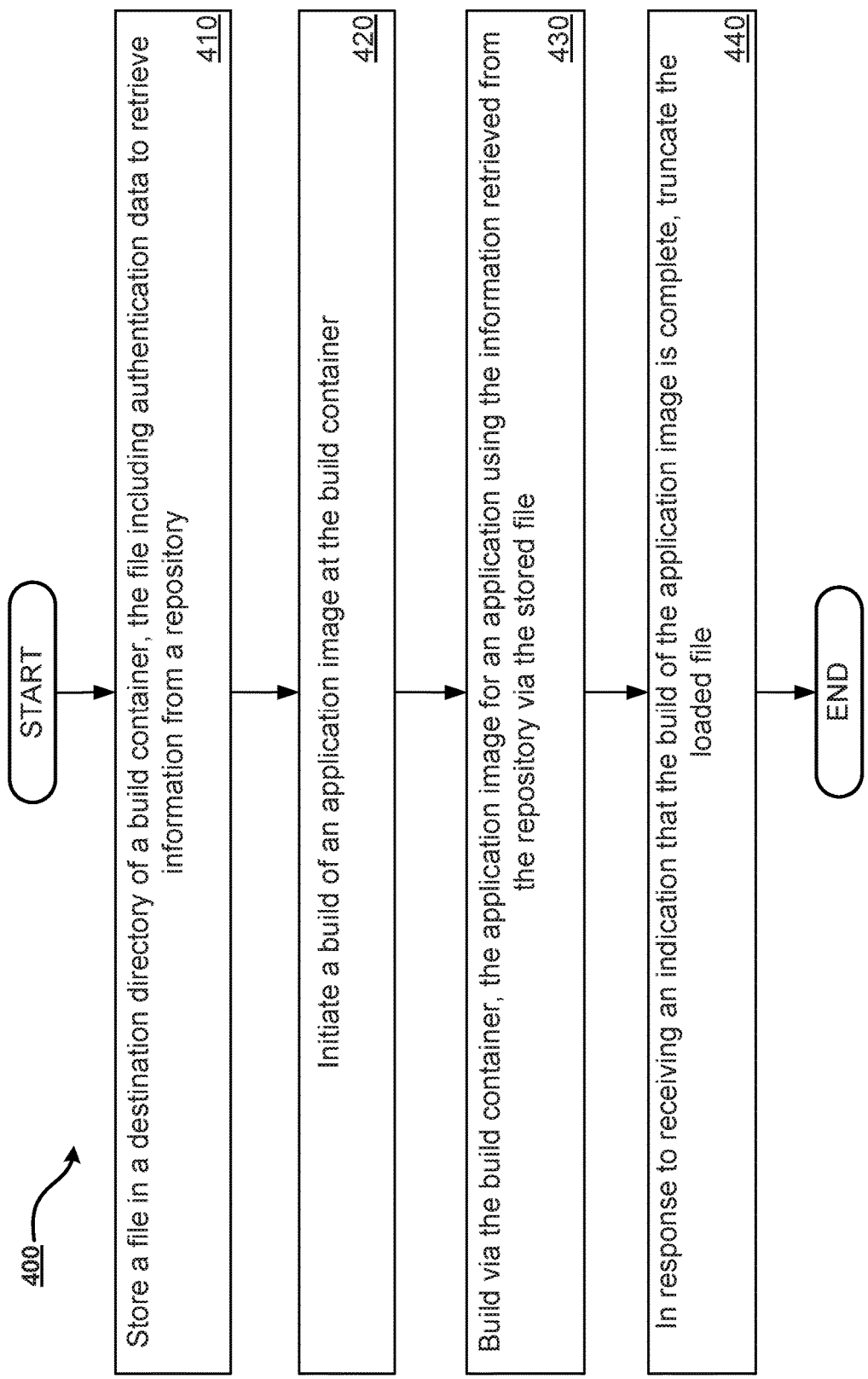
FIG. 4 is a flow diagram illustrating a method for maintaining a file used to build an application image as a build secret according to an implementation of the disclosure.

FIG. 4 is a flow diagram illustrating a method 400 for maintaining a file used to build an application image as a build secret according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by node layer 230, including any of nodes 232a-c, of FIG. 2 and/or node layer 310 of FIG. 3.

Method 400 begins at block 410 where a file in a destination directory of a build container is stored. The file includes authentication data to retrieve information from a repository. Referring to FIG. 3, the file (i.e., configuration file 366) in destination directory 368 of build container 360 is stored. Configuration file 366 may include build secrets including authentication data to retrieve information 374 from private repository 372.

Referring again to FIG. 4, at block 420, a build of an application image is initiated at the build container. As depicted in FIG. 3, a build of assembled application image 350 is initiated at build container 360. In one implementation, during the initiation of the build of an application image, the build container 360 may retrieve the information 374 from private repository 372.

Referring again to FIG. 4, at block 430, the application image for an application is built, via the build container, using the information retrieved from the repository via the stored file. As depicted in FIG. 3, assembled application image 350 is built via the build container 360. The assembled application image 350 may be built using information 374 retrieved from private repository 372 via configuration file 366.

Referring again to FIG. 4, at block 440, in response to receiving an indication that the build of the application image is complete, the loaded file is truncated. As depicted in FIG. 3, in response to receiving an indication that the build of the assembled application image 350 is complete, the configuration file 366 is truncated via build secret logic 258.

The committed application image 370 is then committed to repository 233. The committed application image 370 does not include the build secrets (confidential data) previously contained within configuration file 366 prior to truncation. Therefore, the build secret data contained within configuration file 366 is preserved.

Figure 5:
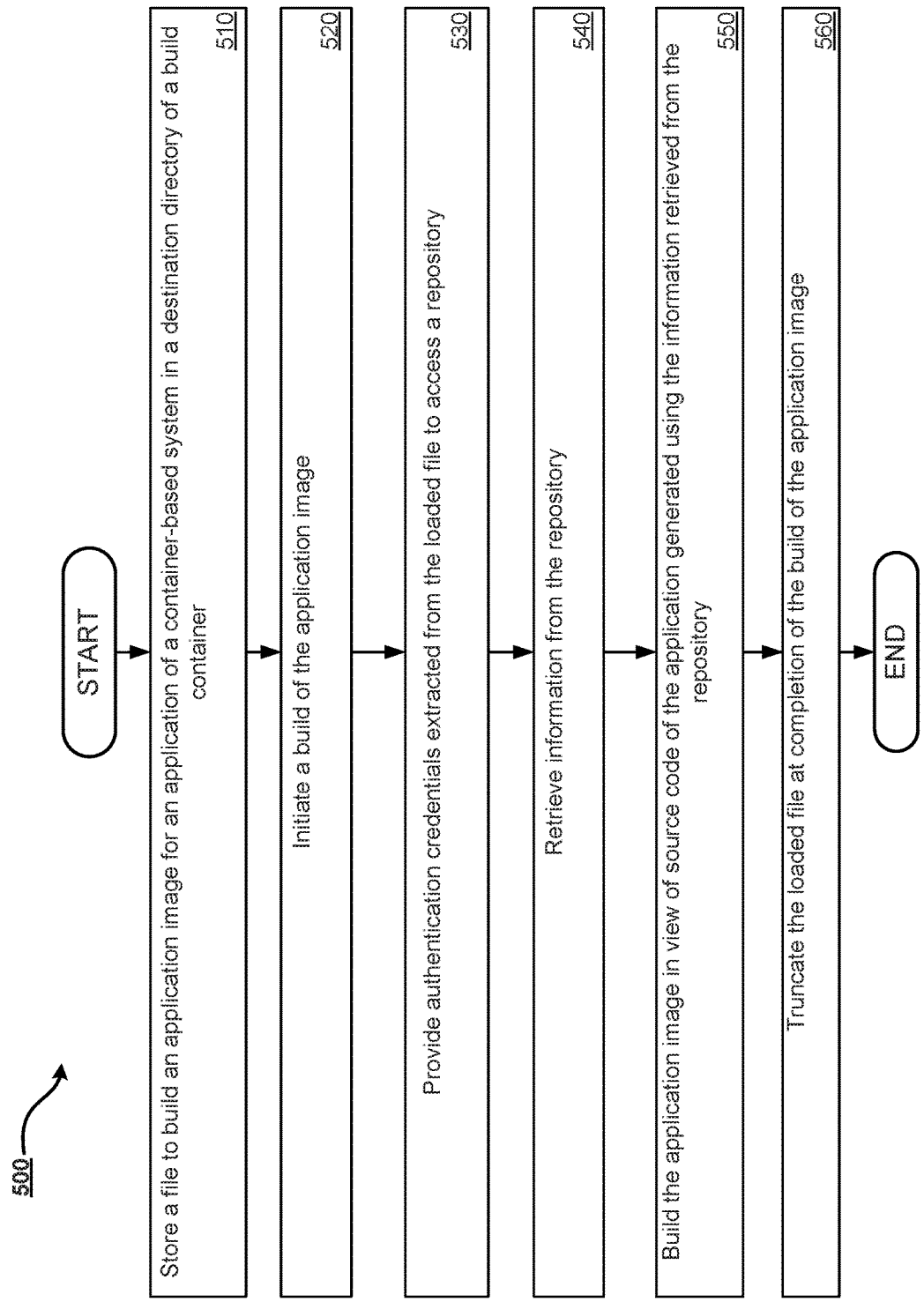
FIG. 5 is a flow diagram illustrating a method for maintaining a file used to build an application image of container-based system as a build secret and using the file to securely obtain information from a remote repository to build the application image according to an implementation of the disclosure.

FIG. 5 is a flow diagram illustrating a method 500 for maintaining a file used to build an application image of container-based system as a build secret and using the file to securely obtain information from a remote repository to build the application image according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by node layer 230, including any of nodes 232a-c, of FIG. 2 and/or node layer 310 of FIG. 3.

Method 500 begins at block 510 where a file to build an application image for an application of a container-based system is stored in a destination directory of a build container.

At block 520, a build of the application image is initiated.

At block 530, authentication credentials extracted from the loaded file to access a repository are provided. As depicted in FIG. 3, authentication credentials are extracted from configuration file 366, via build secret logic 258.

Referring again to FIG. 5, at block 540, information from the repository is retrieved. For example, the authentication credentials may be used to retrieve information from the repository.

At block 550, the application image is built in view of source code of the application generated using the information retrieved from the repository. As depicted in FIG. 3, the assembled application image 350 is built using source code 364 and information 374 retrieved from private repository 372.

Referring again to FIG. 5, at block 560, the loaded file is truncated at completion of the build of the application image.

Figure 6:
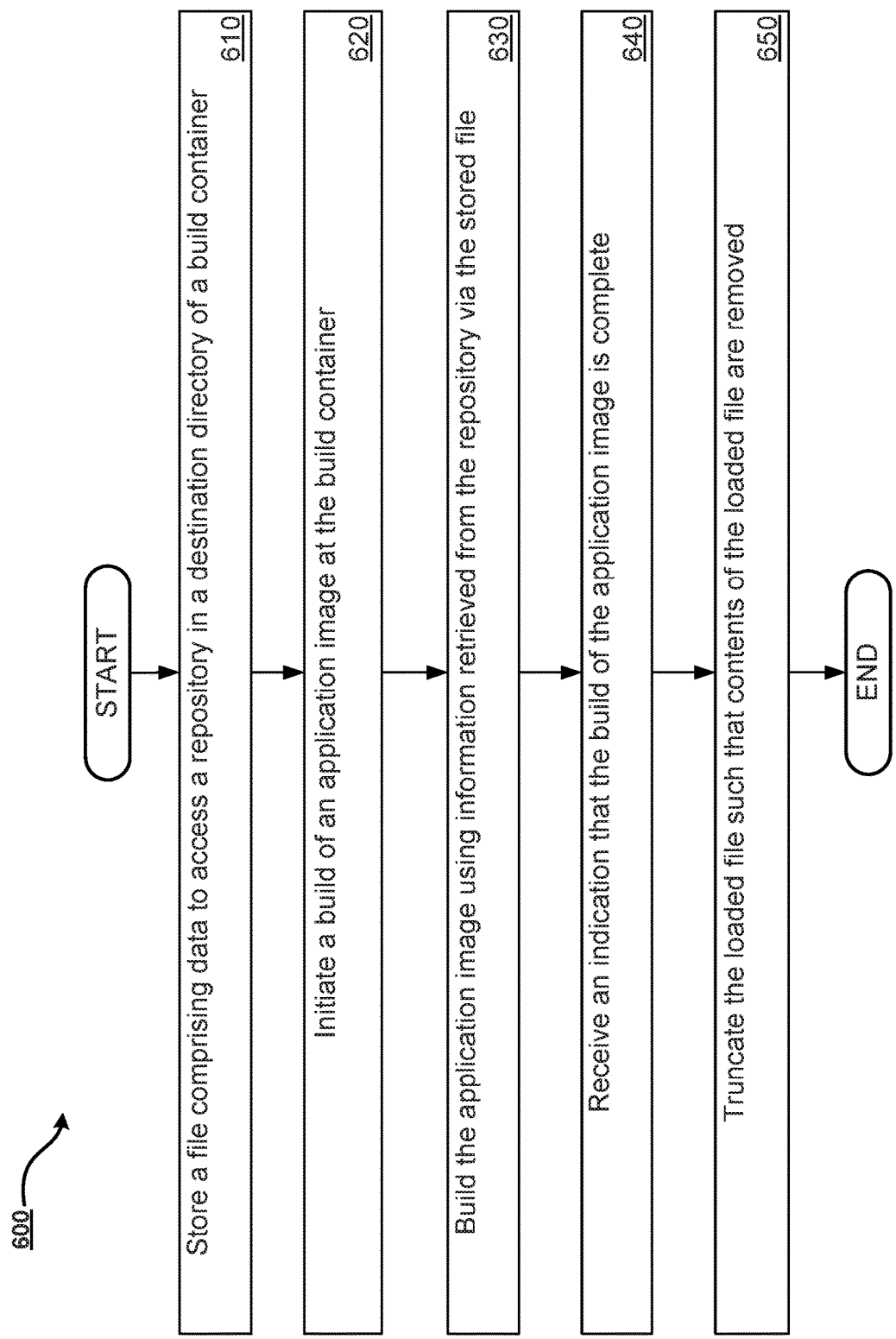
FIG. 6 is a flow diagram illustrating a method for storing a file in a destination directory of a build container and maintaining the file as a build secret according to an implementation of the disclosure.

FIG. 6 is a flow diagram illustrating a method 600 for storing a file in a destination directory of a build container and maintaining the file as a build secret according to an implementation of the disclosure. Method 600 may be performed by processing logic that may comprise hardware (e.g., circuitry, dedicated logic, programmable logic, microcode, etc.), software (such as instructions run on a processing device), firmware, or a combination thereof. In one implementation, method 600 is performed by node layer 230, including any of nodes 232a-c, of FIG. 2 and/or node layer 310 of FIG. 3.

Method 600 begins at block 610, where a file including data to access a repository is stored in a destination directory of a build container.

At block 620, the build of an application image is initiated at the build container.

At block 630, the application image is built using information retrieved from the repository via the stored file.

At block 640, an indication that the build of the application image is complete is received. As depicted in FIG. 3, an indication that the build of committed application image 370 is complete is received at build secret logic 258. The indication may be generated after creating a last file of a build process at build container 360. When build container 360 creates the last file, build container 360 determines that the build is complete and informs build secret logic 258.

Referring again to FIG. 6, at block 650, the loaded file is truncated such that contents of the loaded file are removed.

Although FIG. 3 depicts private repository 372, configuration information may be obtained from one or more remote or local repositories.

Although STI is used throughout to describe source-to-image, STI may also be referred to as S2I.

Figure 7:
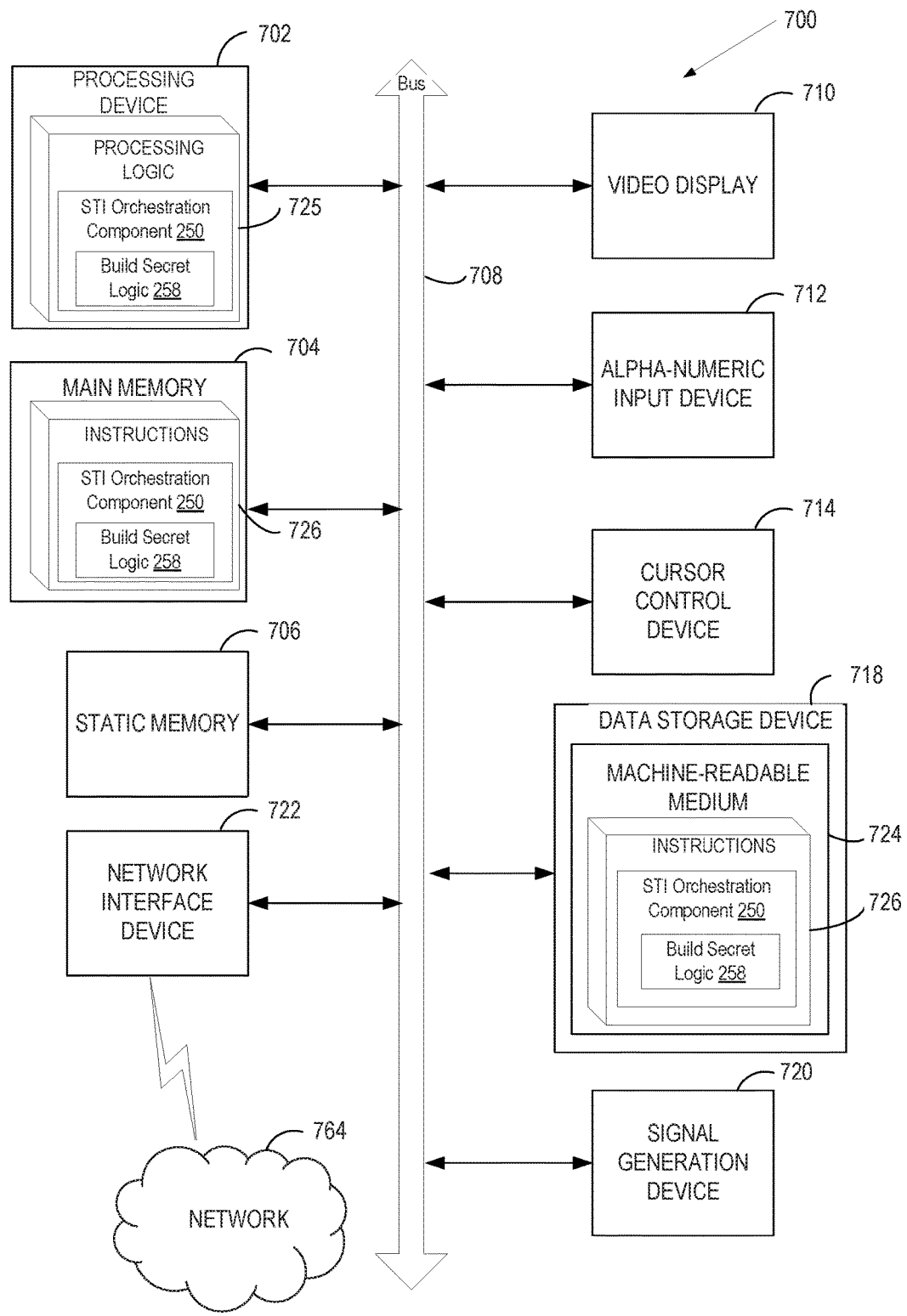
FIG. 7 illustrates a block diagram of one implementation of a computer system.

FIG. 7 illustrates a diagrammatic representation of a machine in the example form of a computer system 700 within which a set of instructions, for causing the machine to perform any one of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730. Processing device 702 may be communicably coupled to memory 704.

Processing device 702 represents general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be special-purpose processing devices such as an application specific integrated circuit (ASIC), a field programmable gate array (FPGA), a digital signal processor (DSP), network processor, or the like. The processing device 702 may execute the processing logic 726 for performing the operations and steps discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 724 on which is stored software 726 embodying any one of the methodologies of functions described herein. The machine-readable storage medium 724 may be a non-transitory machine-readable storage medium. The software 726 may also reside, completely or at least partially, within the main memory 704 as instructions 726 and/or within the processing device 702 as processing logic 726 during execution thereof by the computer system 700; the main memory 704 and the processing device 702 also constituting machine-readable storage media.

The machine-readable storage medium 724 may also be used to store instructions 726 to implement build secret logic 258 in an STI orchestration component 250 to provide a source-to-image framework for a PaaS system and maintenance of build secrets in the PaaS system in a computer system, such as the computer system described with respect to FIG. 1, and/or a software library containing methods that call the above applications. While the machine-readable storage medium 728 is shown in an example implementation to be a single medium, the term "machine-readable storage medium" should be taken to include a single medium or multiple media (e.g., a centralized or distributed database, and/or associated caches and servers) that store the sets of instructions. The term "machine-readable storage medium" shall also be taken to include any medium that is capable of storing, encoding or carrying a set of instruction for execution by the machine and that cause the machine to perform any of the methodologies of the disclosure. The term "machine-readable storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of processes and symbolic representations of operations on data bits within a computer memory. These descriptions and representations are the means used by those skilled in the data processing arts to most effectively convey the substance of their work to others skilled in the art. A process is here, and generally, conceived to be a self-consistent sequence of steps leading to a desired result. The steps are those using physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "invoking", "launching", "accessing", "assembling", "committing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The processes and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite those features regarded as the disclosure.

What is claimed is:

1. A method comprising:

receiving, by a processing device executing build secret logic, a configuration file to utilize to obtain source code for building an application image for an application, the configuration file comprising authentication data to securely connect to a repository comprising the source code and information corresponding to the application;

initiating, by the processing device, a build container to build the application image;

determining, by the build secret logic executed by the processing device, a destination directory of the build container to store the configuration file;

storing, by the build secret logic of the processing device, the configuration file in the destination directory of the build container, wherein the build secret logic to provide a name for the configuration file to identify the configuration file as comprising a build secret;

initiating, by the processing device, a build of the application image at the build container;

executing, by the build secret logic, a wrapper script in association with the build container;

building, by the processing device via the wrapper script and the build container, the application image for an application using the source code and the information retrieved from the repository via the stored configuration file;

identifying, by the wrapper script, a last file of the application image using an identifier of the last file; and
in response to the wrapper script identifying the last file of the application image and prior to deploying the application image, truncating, by the wrapper script as part of the build of the application image, the stored configuration file.

2. The method of claim 1, further comprising retrieving from the repository, by the processing device via the stored configuration file prior to completion of the build of the application image, the information comprising an additional dependency to perform the build of the application image.

3. The method of claim 2, further comprising overwriting an existing dependency in the application image with the additional dependency.

4. The method of claim 1, wherein the truncating the stored configuration file comprises converting a length of the stored file to a zero bit length.

5. The method of claim 1, further comprising:
committing the application image to a committed application image repository, wherein the image does not include the authentication data.

6. The method of claim 1, wherein the application image is associated with files of the application used to deploy functionality for a runtime instance of the application.

7. The method of claim 1, wherein the repository is a private repository and wherein the stored configuration file further comprises a uniform resource locator providing a location to the private repository.

8. The method of claim 1, further comprising generating, by the processing device, the name for the stored configuration file identifying the stored configuration file as a configuration file.

9. The method of claim 1, wherein the stored configuration file is truncated via the wrapper script in response to creating the last file of the application image.

10. The method of claim 1, further comprising creating the destination directory in the build container.

11. A system comprising:
a memory; and
a processing device of a container-based system, the processing device communicably coupled to the memory, the processing device to:
execute build secret logic for a build of an application image of an application;
receive, via the build secret logic, a configuration file for obtaining source code for the build, the configuration file comprising authentication data to securely connect to a repository comprising the source code and information corresponding to the application;
initiate a build container to build the application image;
determine, via the build secret logic, a destination directory of the build container to store the configuration file;
store, using the build secret logic, the configuration file in the destination directory of the build container, wherein the build secret logic to provide a name for the configuration file to identify the configuration file as comprising a build secret;
initiate a build of the application image at the build container;
provide authentication credentials extracted from the stored configuration file to access a repository;
retrieve the information and the source code from the repository;
execute, by the build secret logic, a wrapper script in association with the build container;
build the application image, via the wrapper script and the build container, in view of the source code and the information retrieved from the repository via the stored configuration file;
identify, by the wrapper script, a last file of the application image using an identifier of the last file; and
in response to the wrapper script identifying the last file of the application image and prior to deploying the application image, truncate, by the wrapper script, the stored configuration file as part of the build of the application image via the build container.

12. The system of claim 11, wherein a permission of the stored configuration file comprises write access.

13. The system of claim 11, wherein to truncate the stored configuration file the processing device is further to convert a length of the stored configuration file to a zero bit length.

14. The system of claim 11, wherein the repository is located remotely from the processing device.

15. The system of claim 11, wherein the repository is a private repository and wherein the stored configuration file further comprises a uniform resource locator providing a location to the private repository.

16. The system of claim 11, wherein the container-based system is a multi-tenant platform-as-a-service (PaaS) system.

17. A non-transitory machine-readable storage medium including instructions that, when accessed by a processing device, cause the processing device to:
receive, by the processing device executing build secret logic, a configuration file to utilize to obtain source code for building an application image for an application, the configuration file comprising authentication data to securely connect to a repository comprising the source code and information corresponding to the application;
initiate, by the processing device, a build container to build the application image;
determine, by the build secret logic executed by the processing device, a destination directory of the build container to store the configuration file;
store, by the build secret logic of the processing device, the configuration file in the destination directory of the build container, wherein the build secret logic to provide a name for the configuration file to identify the configuration file as comprising a build secret;
initiate, by the processing device, a build of the application image at the build container;
execute, by the build secret logic, a wrapper script in association with the build container;
build, by the processing device via the wrapper script and the build container, the application image for an application using the source code and the information retrieved from the repository via the stored configuration file;
identify, by the wrapper script, a last file of the application image using an identifier of the last file; and
in response to the wrapper script identifying the last file of the application image and prior to deploying the application image, truncate, by the wrapper script as part of the build of the application image, the stored configuration file.

18. The non-transitory machine-readable storage medium of claim 17, wherein the processing device is further to retrieve from the repository via the stored configuration file prior to completion of the build of the application image, the information comprising an additional dependency to perform the build of the application image.

19. The non-transitory machine-readable storage medium of claim 18, wherein the processing device is further to overwrite an existing dependency with the additional dependency.

20. The non-transitory machine-readable storage medium of claim 17, wherein to truncate the stored configuration file, the processing device is further to convert a length of the stored configuration file to a zero bit length.

* * * * *